United States Patent

[11] 3,587,958

| [72] | Inventor | Monroe F. Taylor<br>Greenville, S.C. |
|---|---|---|
| [21] | Appl. No. | 814,307 |
| [22] | Filed | Apr. 8, 1969 |
| [45] | Patented | June 28, 1971 |
| [73] | Assignee | W. R. Grace & Co.<br>Duncan, S.C. |

[54] APPARATUS FOR CONTROLLING THE TRACKING OF CONTINUOUS SHEETS OF FILM
2 Claims, 6 Drawing Figs.

| [52] | U.S. Cl. | 226/17, 226/22 |
|---|---|---|
| [51] | Int. Cl. | B65h 23/02 |
| [50] | Field of Search | 226/17, 22 |

[56] References Cited
UNITED STATES PATENTS

| 1,752,966 | 4/1930 | Rusden | 226/17X |
|---|---|---|---|
| 2,737,386 | 3/1956 | Reher | 226/17 |
| 3,368,726 | 2/1968 | Funk et al. | 226/17 |

Primary Examiner—Allen N. Knowles
Attorneys—John J. Toney, William D. Lee, Jr. and Edward J. Hanson, Jr.

ABSTRACT: A method and apparatus for controlling the tracking of a continuous sheet of film whose edges are taut comprising monitoring the position of the film edges and passing the film edges between pairs of opposed rollers set at a predetermined angle so that when a roller pair is closed in response to the edge monitoring the film moves in the direction of the closed roller pair.

INVENTOR
MONROE F. TAYLOR
BY William D. Lee Jr.
ATTORNEY

APPARATUS FOR CONTROLLING THE TRACKING OF CONTINUOUS SHEETS OF FILM

BACKGROUND OF THE INVENTION

This invention relates generally to a method and apparatus for controlling the tracking of a continuous sheet of film. Specifically, the invention relates to continuous packaging of articles in flexible, sheetlike material wherein the positioning of the material is of critical importance in the packaging operation.

In one method of packaging articles in a continuous sheet of film, film is continuously fed from a roll, articles are placed on the film, and, as the film and articles move together, the longitudinal edges of the film are brought up on either side of the article and sealed together to form a continuous tube. Once the tube is formed the film can be sealed and cut between successive articles thus forming a completely wrapped package. When packages are wrapped in this manner by automatic or semiautomatic machinery at high speeds it becomes necessary to control the position of the film edges so they can be sealed together at maximum speed and with minimum wastage of material. It is therefore an object of the present invention to provide a method and apparatus for controlling the position of the film edges in automatic packaging equipment.

It is another object of the present invention to provide a simple and fast acting method of correcting the position of a continuous roll of film used in automatic packaging.

It is a further object of the present invention to enable packaging materials to be used more efficiently.

These objects and the advantages of the present invention will become apparent from the following description and drawings.

SUMMARY

The present invention must be employed in a packaging system in which tension is placed on the film, particularly at the film's edges so that the edges are relatively taut. In most continuous, automatic packaging machines the film will be under tension as it is pulled from the film supply roll to the film folding and sealing area. The method of the present invention comprises monitoring the edges of the film as the edges pass between a pair of opposed rollers set at predetermined angles so that when a roller pair is closed in response to the edge monitoring the film moves in the direction of the closed roller pair. The rollers are held closed until the film has moved to its correct position whereupon the rollers open again.

The movement of the film causes the closed rollers to turn, and in turning, exert a force against the film which causes it to move toward the closed roller. By placing a pair of rollers on either side of the film, the film position can be changed as necessary.

The apparatus comprises sensing means at each opposed edge of the film sheet which are responsive to the position of the edge. Two pairs of rollers are placed at opposed longitudinal edges of the film with a film edge passing between each pair of rollers. Means responsive to the edge-sensing means open and close the pairs of rollers against the film so that the rollers securely grip the film when closed. Mounting means hold the rollers at an angle such that when closed force will be exerted on the sheet of film to move it toward the closed rollers.

The invention will be better appreciated as it is described reference to the drawings appended hereto.

DETAILED DESCRIPTION

Figure 6:
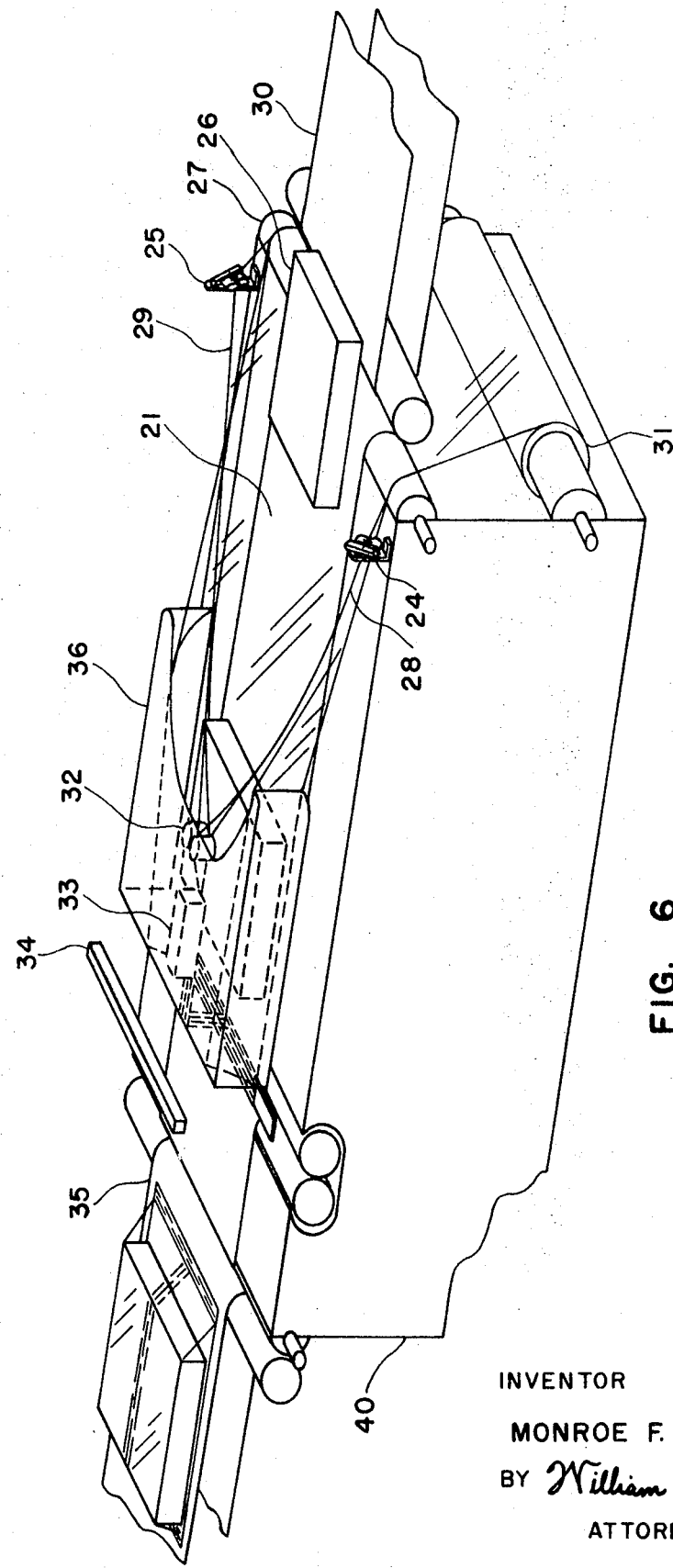
FIG. 6 shows a schematic representation of one type of automatic packaging equipment with which the subject invention may be used.

Referring first to FIG. 6, an automatic-packaging device is shown using the film-tracking apparatus of the present invention. Packaging film is held in a supply 31 and is brought up over roll 27 and drawn forth through driven gathering rolls 32. Articles 26 which are to be packaged are delivered from conveyor 30 onto the film 21 which is drawn from supply roll 31. The edges of the film 28 and 29 are held taut by the action of rollers 32 pulling the film from roll 31. Folding shoe or box 36 causes the film to fold in a tube around the articles 26. The edges of the film 28 and 29 which have been placed together by the action of rollers 32 are sealed by sealer 33. The articles are now longitudinally spaced in a continuous tube of film. A sealing and cutting bar 34 is provided to sever and seal the film between each article to make a completed package. If the packaging film is a heat shrinkable type, conveyor belt 35 can conduct the packages to a heat tunnel where the film will be shrunk tightly about the article.

The edges of the film 28 and 29 pass through respective roller pairs on film tracking control devices 24 and 25. These devices serve to position the film so that the packages will be properly positioned on the film and the edges of the film will meet in a position so that sealing will take place with a minimum of film wastage.

Figure 5:
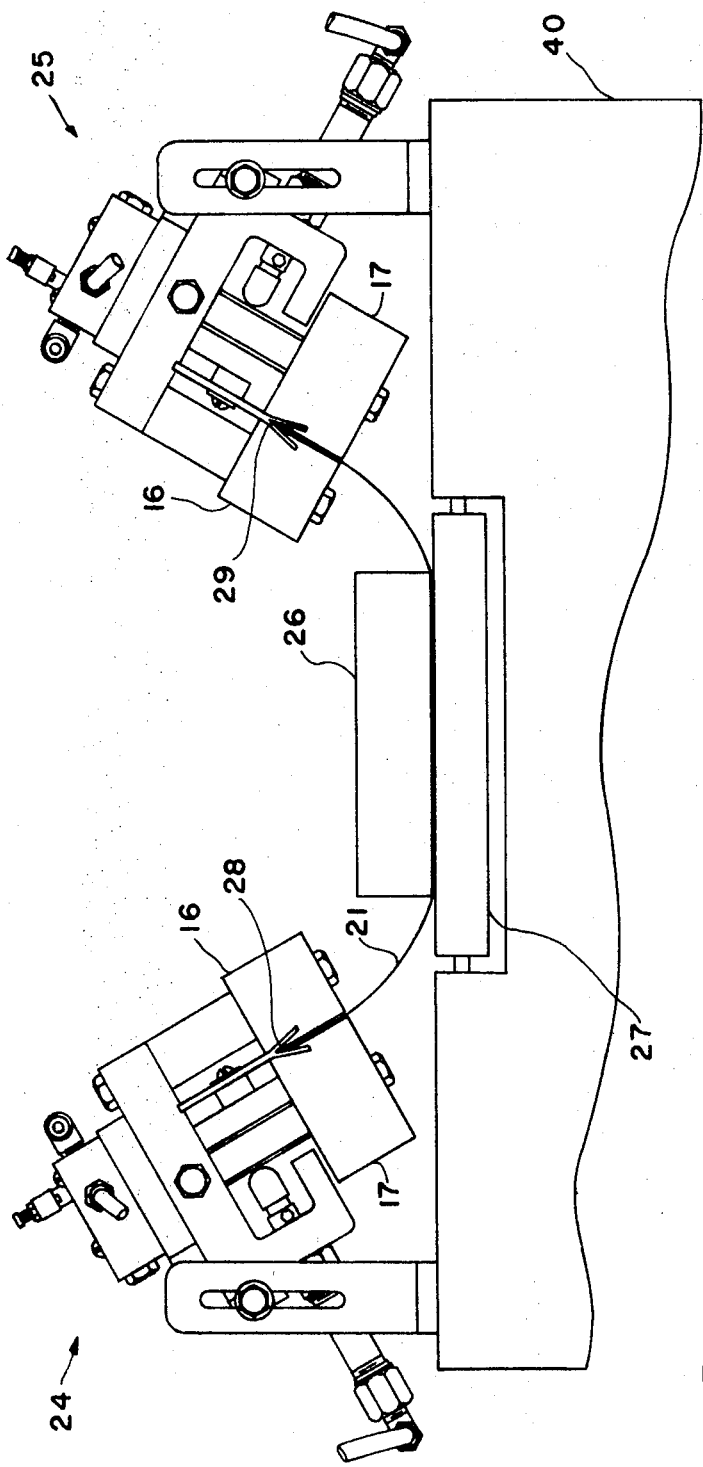
FIG. 5 shows a pair of apparati of FIG. 1 in working position with a sheet of film and an article to be wrapped therein.

Referring now to FIG. 5, film tracking apparati 24 and 25 are shown with the longitudinal edges 28 and 29 of film sheet 21 held between rollers 16 and 17 of the respective devices. Article 26 is shown placed on film sheet 21 in position to be wrapped in the film.

Figure 1:
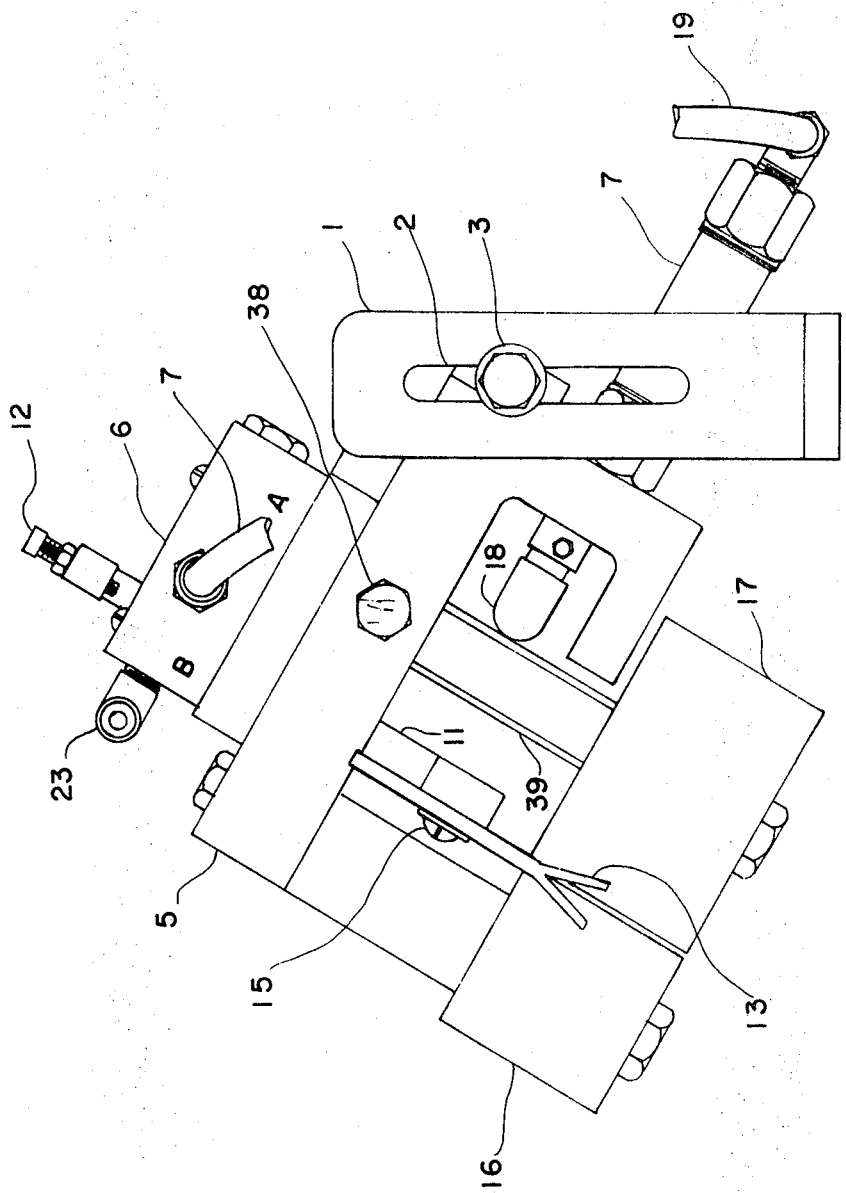
FIG. 1 is a view in elevation of the front side of an apparatus embodying the present invention.
Figure 2:
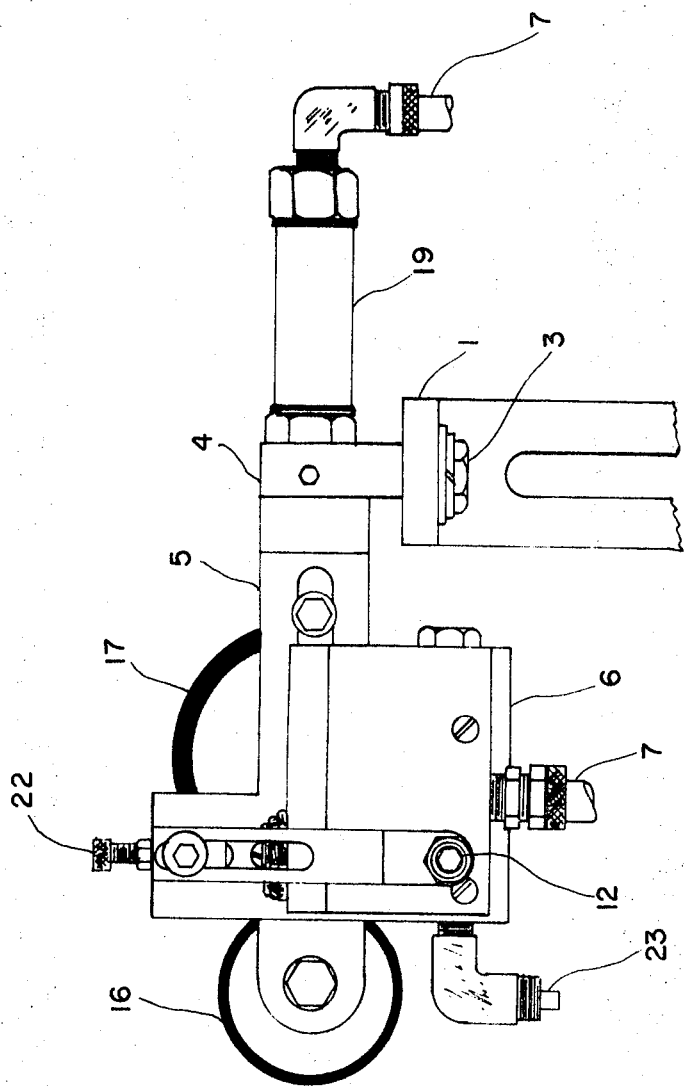
FIG. 2 is a top view of an apparatus of FIG. 1.

Turning now to FIG. 1 for complete understanding of the operation of the tracking devices 24 and 25, the front working position of tracking device 25 is seen. Obviously, tracking device 24 is a mirror image of device 25 and the two devices work cooperatively to position the film. In FIG. 1 mounting bracket 1 is shown having a slot 2 through which adjusting bolt 3 passes to threaded nut housing 4 (see FIG. 2) which is securely fixed to frame 5 and supports same. This adjusting nut and bolt allows the height and angle of frame 5 to be varied. Pneumatic switch 6 is carried at the top of frame 5; and, pneumatic switch 6 is provided with switch button 8 (See FIGS. 3 and 4). Switch 6 controls compressed air which is supplied through line 23 and exits from switch 6 through line 7.

Figure 3:
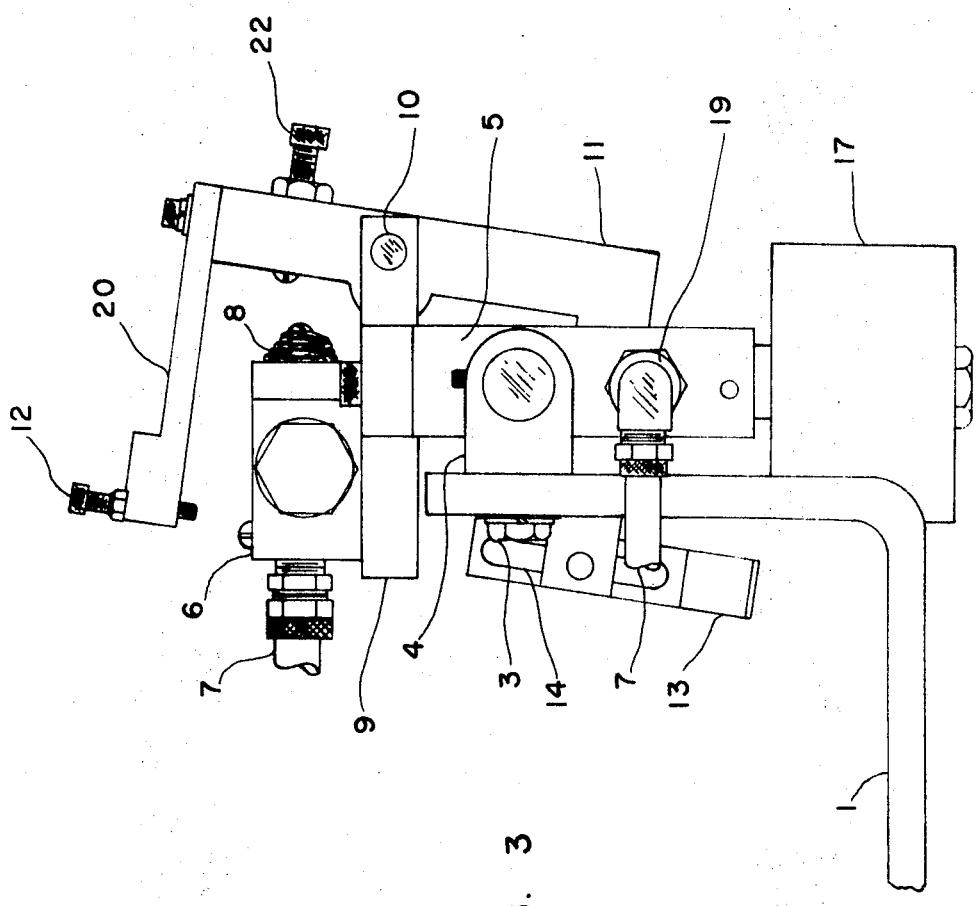
FIG. 3 is a view in elevation of the right side of the apparatus of FIG. 1.
Figure 4:
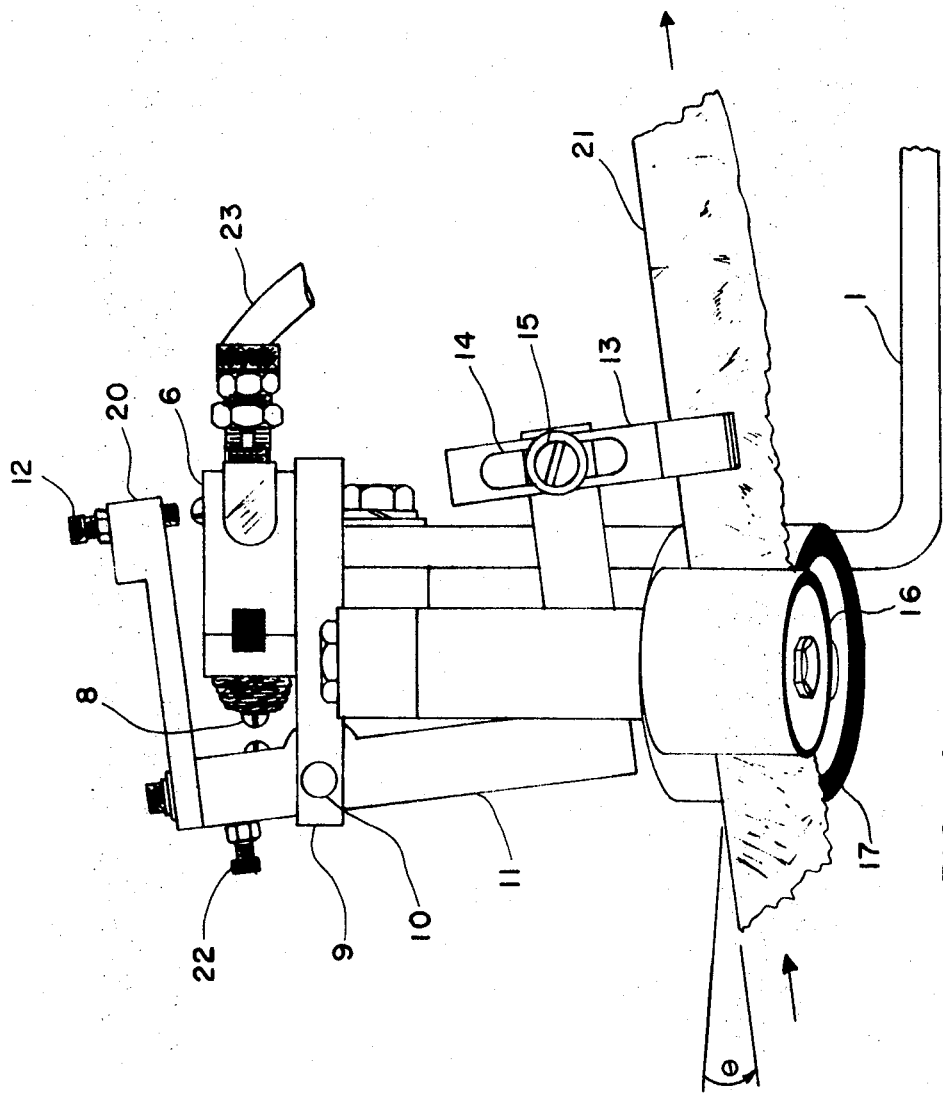
FIG. 4 is a view of the left side of the apparatus of FIG. 1 showing the edge of a sheet of film in working position.

In FIGS. 3 and 4 L-shaped arm 11 can be seen. Arm 11 is pivotally mounted on supporting member 9 which is securely fastened to frame 5. Thus, arm 11 can rotate about pivot 10. Connected to one end of arm 11 is motion limiting member 20 having adjustment screw 12 placed therein. At the other end of arm 11 is film sensor 13 having adjustment slot 14 provided therein so that the sensor's position can be varied by means of adjustment nut 15. Film sensor 13 is Y-shaped and is adapted so that the edge of film 21 can slidably pass through the vertex of the Y. In operation, film sensor 13 actually rides on the taut film edge so that any variation in the position of the edge will be immediately monitored.

Returning to FIG. 1 fixed roller 16 can be seen mounted to frame 5. Mounted immediately adjacent to fixed roller 16 is movable roller 17. Both of the rollers are covered with rubber or provided with an equivalent surface so that film passing between the two rollers may be firmly gripped yet not damaged. Movable roller 17 is mounted into frame 5 through pivot 38 around which the movable roller 17 can rotate. The movable roller shaft 39 is contacted by plunger 18 which is directly connected to the piston of pneumatic cylinder 19. To complete the operable device, pneumatic line 7 connects cylinder 19 with switch 6.

The foregoing has described the component parts of a preferred embodiment according to the present invention. Now, the mode of operation will be described by first referring to FIG. 4. In FIG. 4 the edge of film 21 is seen passing through the vertex of the film sensor 13 which rides on the edge of the film. The film also passes between rollers 16 and 17. The film is moving in the direction of the arrows and the rollers are set so that the film passes therethrough at a slight angle, $\theta$. The magnitude of the angle is not critical and is preferably small; but, an angle is necessary so that when the rollers close force will be exerted upon the film thereby moving it upwardly. The adjustment of the angle can easily be accomplished by one skilled in the art for film sizes and for direction of motion of the film. To adjust the angle, frame 5 may be rotated with respect to threaded nut housing 4 which carries the frame. (See FIG. 3) Adjusting bolt 3 will be used for angle adjustments as well as height adjustment. Nut 15 on the sensor (See FIG. 4) will adjust sensor 13 position.

Still referring to FIG. 4, it can be seen that when the edge of film 21, upon which film sensor 13 is riding, moves downward that arm 11 rotates about pivot 10 thus striking the button 8 of pneumatic switch 6. When the switch is opened, compressed air from supply line 23 will pass through the switch into pneumatic line 7 (See FIGS. 1 and 2) and will actuate the piston in pneumatic cylinder 19. The piston will drive plunger 18 against the movable roller shaft 39 causing movable roller 17 to close against fixed roller 16 thus tightly gripping the edge of the film 21 between the two rollers. The motion of the film will cause the rollers to rotate and the rollers in turn will exert an upward force on the film 21. When the film 21 has moved upward film sensor 13 will cause arm 11 to rotate away from switch button 8 thus closing the switch 6 and consequently releasing the plunger 18 which allows movable roller 17 to release its grip on the film 21.

Acting in cooperation with the right-hand tracking device 25, as seen in FIG. 5, is the mirror image device 24 which grips the opposed longitudinal edge of the film 21. As is evident from the foregoing description, when the right-hand pair of rollers is closed, film edge 29 will tend to move upwardly thus causing the left-hand edge 28 to move downwardly. In like manner, closing of the rolls on the left-hand pair of rollers will cause the film edge 28 to move upwardly with a corresponding downward movement of the right-hand edge 29. Thus, once the film sheet 21 is centered in the tracking devices 24 and 25, their cooperating monitoring and correction of the film edge position will keep the film 21 centered in a packaging machine.

Many modifications can be made in the above-described preferred embodiment and still be within the scope of the invention. For instance, rather than be pneumatically operated, the tracking device can be electrically operated. Thus, an electric switch can be substituted for pneumatic switch 6 which would send current to a solenoid-operated plunger to open and close the pair of rollers. Also, a grooved roller could ride on the edge of the film 21 as a substitute for the Y-shaped film sensor 13. Such a roller could be attached to a sliding electrical contact so that the movement up and down of the sensor would open and close an electrical circuit to a solenoid.

Having thus described my invention, which permits continuous monitoring and adjustment of the position of film fed to a packaging machine without the interruption of operation thereof, I claim:

1. A device for controlling the tracking of a continuous sheet of film whose longitudinal edges are taut comprising:
    a. a mounting bracket having a vertical slot;
    b. a frame member;
    c. an adjusting bolt slidably disposed within the slot in said mounting bracket, said bolt securing said frame member to said bracket and permitting the angle of the frame with respect to the vertical to be adjusted;
    d. a supporting member firmly attached to said frame;
    e. an L-shaped arm pivotally mounted to said supporting member;
    f. a Y-shaped film sensor disposed so that the vertex of said film sensor rides on the edge of said film, said sensor being mounted at one extremity of said arm;
    g. a pneumatic switch mounted on said frame so that said switch may be actuated by contact with the other extremity of said arm;
    h. a first roller fixedly mounted to said frame;
    i. a second roller movably mounted to said frame, said first and second rollers being mounted so that the edge portion of said film can pass therebetween;
    j. a pneumatic cylinder mounted on said frame, said cylinder having a pneumatically actuated piston;
    k. a plunger attached to said piston, said plunger being so disposed as to urge said movable roller against said fixed roller when said cylinder is actuated;
    l. a pneumatic supply line to said switch; and,
    m. a pneumatic line connecting said switch and said cylinder whereby when the sensor moves in response to a change in the position of the film, the arm will pivot opening the switch which admits air to the cylinder thus actuating the plunger to urge the movable roller against the fixed roller.

2. An apparatus for controlling the tracking of a continuous sheet of film whose longitudinal edges are taut comprising a pair of devices according to claim 1, said devices being positioned at opposite edges of said film, each respective edge of said film passing through the respective first and second rollers of each respective device and the respective Y-shaped sensor of each respective device riding upon the respective film edge.